(12) United States Patent
Yamada

(10) Patent No.: US 10,339,636 B2
(45) Date of Patent: Jul. 2, 2019

(54) IMAGE PROCESSING APPARATUS THAT SPECIFIES EDGE PIXEL IN TARGET IMAGE BY CALCULATING EDGE STRENGTH

(71) Applicant: BROTHER KOGYO KABUSHIKI KAISHA, Nagoya, Aichi (JP)

(72) Inventor: Ryuji Yamada, Ogaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/900,918

(22) Filed: Feb. 21, 2018

(65) Prior Publication Data
US 2018/0253828 A1    Sep. 6, 2018

(30) Foreign Application Priority Data

Mar. 3, 2017    (JP) ................. 2017-041160

(51) Int. Cl.
| | | |
|---|---|---|
| G06T 5/00 | (2006.01) | |
| G06K 15/02 | (2006.01) | |
| H04N 1/409 | (2006.01) | |
| H04N 1/58 | (2006.01) | |

(Continued)

(52) U.S. Cl.
CPC .......... *G06T 5/002* (2013.01); *G06K 15/1822* (2013.01); *G06K 15/1847* (2013.01); *G06K 15/1873* (2013.01); *G06K 15/1881* (2013.01); *G06T 7/13* (2017.01); *H04N 1/4092* (2013.01); *H04N 1/58* (2013.01);

(Continued)

(58) Field of Classification Search
CPC . G06T 5/002; G06T 7/13; G06T 2207/20192; G06T 2207/10024; G06T 2207/10008; G06K 15/1847; G06K 15/1873; G06K 15/1881; G06K 15/1822; H04N 1/58; H04N 1/4092; H04N 1/405
See application file for complete search history.

(56) References Cited

U.S. PATENT DOCUMENTS

| | | | |
|---|---|---|---|
| 2011/0085738 A1 | 4/2011 | Kitamura et al. | |
| 2013/0259363 A1* | 10/2013 | Ozawa | G06K 9/4652 382/164 |
| 2013/0259383 A1* | 10/2013 | Kondo | G06K 9/46 382/199 |

FOREIGN PATENT DOCUMENTS

JP       2009-282928 A     12/2009

* cited by examiner

*Primary Examiner* — Neil R McLean
(74) *Attorney, Agent, or Firm* — Scully, Scott, Murphy & Presser, PC

(57) ABSTRACT

An image processing apparatus performs: acquiring target image data representing a target image including a plurality of pixels, the target image data including a plurality of pixel values each having a plurality of component values; generating image data, the image data being one of first and second component data respectively including a plurality of first and second pixel values, each of the plurality of first and second pixel values being respectively related to maximum and minimum values among the plurality of component values of corresponding one of the plurality of pixels; calculating a plurality of edge strengths corresponding to respective ones of the plurality of pixels using the image data to generate edge strength data including the plurality of edge strengths; and specifying a plurality of edge pixels included in the target image. The specifying includes binarizing the edge strength data to generate binary image data.

19 Claims, 11 Drawing Sheets

(51) Int. Cl.
  *G06T 7/13* (2017.01)
  *H04N 1/405* (2006.01)
(52) U.S. Cl.
  CPC ............... *G06T 2207/10008* (2013.01); *G06T 2207/10024* (2013.01); *G06T 2207/20192* (2013.01); *H04N 1/405* (2013.01)

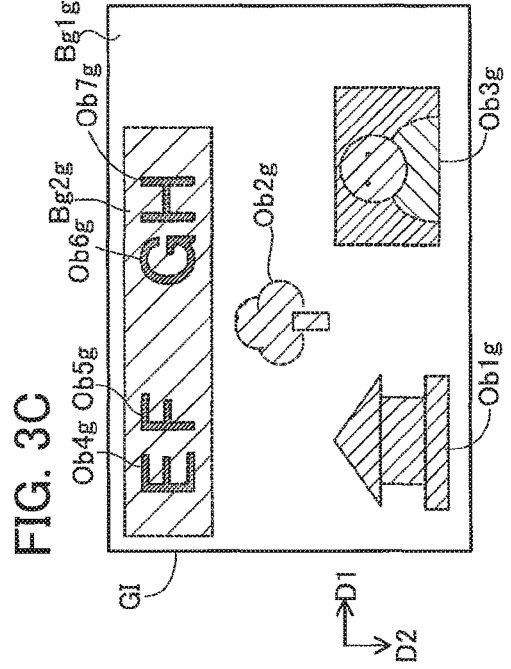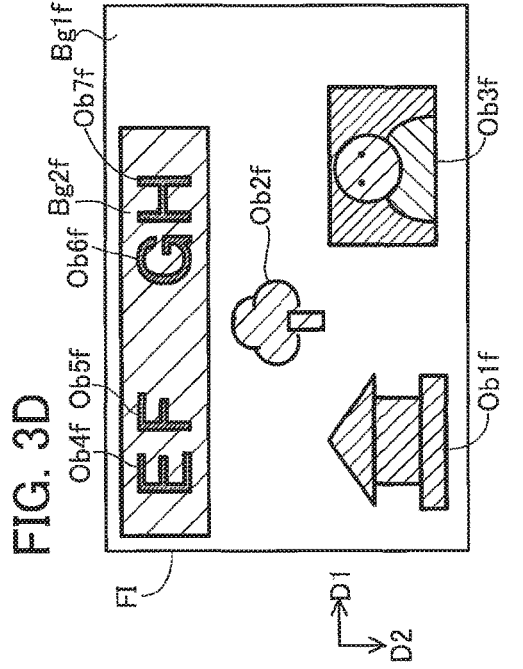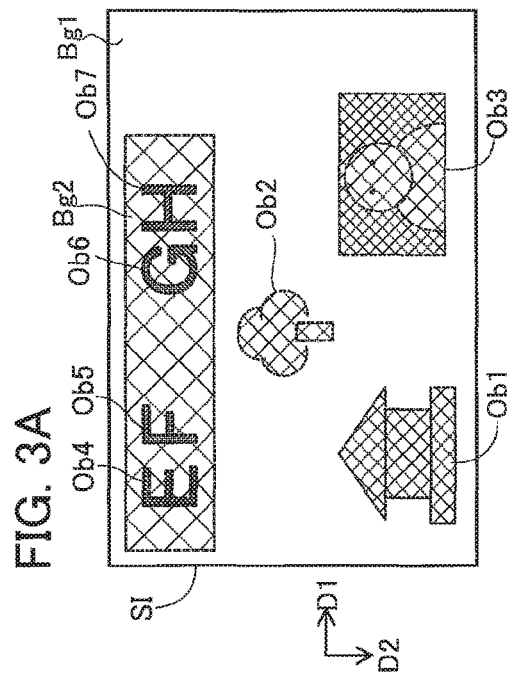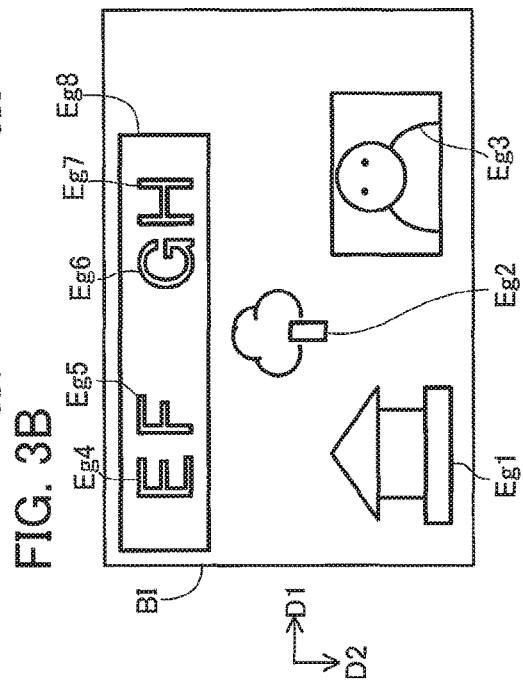

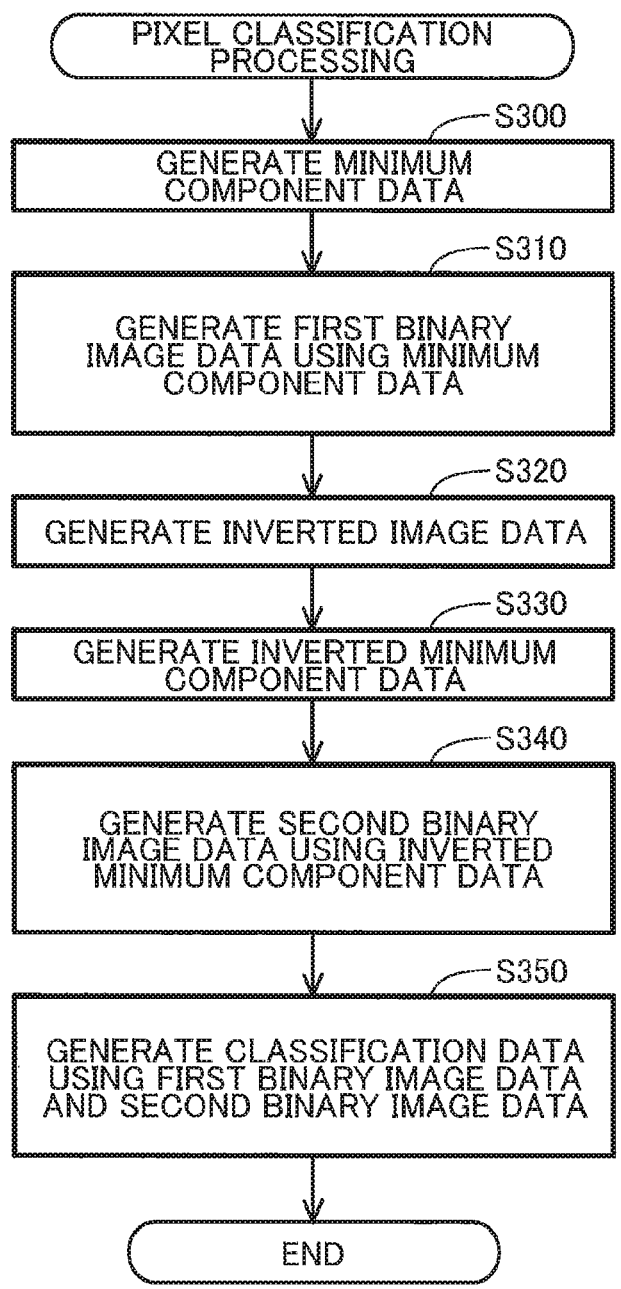

IMAGE PROCESSING APPARATUS THAT SPECIFIES EDGE PIXEL IN TARGET IMAGE BY CALCULATING EDGE STRENGTH

CROSS REFERENCE TO RELATED APPLICATION

This application claims priority from Japanese Patent Application No. 2017-041160 filed Mar. 3, 2017. The entire content of the priority application is incorporated herein by reference.

TECHNICAL FIELD

The present disclosure relates to image processing for specifying edge pixels constituting edges in an image represented by image data.

BACKGROUND

Conventionally, there has been known an edge extracting device that applies smoothing processing to an image represented by image data using a Gaussian filter. The edge extracting device calculates edge strengths of the image that has been subjected to the smoothing processing using a differentiation filter to thereby generate an edge strength image. The edge extracting device then applies threshold processing to the edge strength image to thereby extract edges in the image.

SUMMARY

In the above technique, however, a density difference may appear even in a portion of the image where an edge pixel to be specified does not exist, depending on the color of that portion. As a result, a pixel different from the edge pixel may be erroneously specified as an edge pixel, which may reduce the accuracy of specifying edge pixels.

In view of the foregoing, it is an object of the disclosure to provide a technique that can improve the accuracy of specifying edge pixels in a target image.

In order to attain the above and other objects, the present disclosure provides an image processing apparatus that includes: a processor; and a memory. The memory stores a set of computer-readable instructions therein. The set of computer-readable instructions, when executed by the processor, causes the image processing apparatus to perform: acquiring target image data representing a target image including a plurality of pixels, the target image data including a plurality of pixel values corresponding to respective ones of the plurality of pixels, each of the plurality of pixel values having a plurality of component values; generating first image data representing a first image, the first image data being one of first component data and second component data, the first component data including a plurality of first pixel values corresponding to respective ones of the plurality of pixels, each of the plurality of first pixel values being related to a maximum value among the plurality of component values of corresponding one of the plurality of pixels, the second component data including a plurality of second pixel values corresponding to respective ones of the plurality of pixels, each of the plurality of second pixel values being related to a minimum value among the plurality of component values of corresponding one of the plurality of pixels; calculating a plurality of first edge strengths corresponding to respective ones of the plurality of pixels using the first image data to generate first edge strength data including the plurality of first edge strengths; and specifying a plurality of edge pixels included in the target image, wherein the specifying includes binarizing the first edge strength data to generate first binary image data.

According to another aspect, the present disclosure provides a non-transitory computer readable storage medium storing a set of program instructions installed on and executed by a computer. The set of program instructions includes: acquiring target image data representing a target image, the target image including a plurality of pixels, each of the plurality of pixels having a plurality of component values; generating first image data representing a first image, the first image data being one of first component data and second component data, the first component data including a plurality of first pixel values corresponding to respective ones of the plurality of pixels, each of the plurality of first pixel values being related to a maximum value among the plurality of component values of corresponding one of the plurality of pixels, the second component data including a plurality of second pixel values corresponding to respective ones of the plurality of pixels, each of the plurality of second pixel values being related to a minimum value among the plurality of component values of corresponding one of the plurality of pixels; calculating a plurality of first edge strengths corresponding to respective ones of the plurality of pixels using the first image data to generate first edge strength data including the plurality of first edge strengths; and specifying a plurality of edge pixels included in the target image, wherein the specifying includes binarizing the first edge strength data to generate first binary image data.

According to still another aspect, the present disclosure provides an image processing method. The image processing method includes: acquiring target image data representing a target image, the target image including a plurality of pixels, each of the plurality of pixels having a plurality of component values; generating image data, the image data being one of first component data and second component data, the first component data including a plurality of first pixel values corresponding to respective ones of the plurality of pixels, each of the plurality of first pixel values being related to a maximum value among the plurality of component values of corresponding one of the plurality of pixels, the second component data including a plurality of second pixel values corresponding to respective ones of the plurality of pixels, each of the plurality of second pixel values being related to a minimum value among the plurality of component values of corresponding one of the plurality of pixels; calculating a plurality of edge strengths corresponding to respective ones of the plurality of pixels using the first image data to generate edge strength data including the plurality of edge strengths; and specifying a plurality of edge pixels included in the target image, wherein the specifying includes binarizing the edge strength data to generate binary image data.

BRIEF DESCRIPTION OF THE DRAWINGS

The particular features and advantages of the disclosure as well as other objects will become apparent from the following description taken in connection with the accompanying drawings, in which:

FIGS. 3A to 3D are first views each illustrating an example of an image used in the image processing, in which FIG. 3A illustrates an example of a scan image represented by scan data, FIG. 3B illustrates an example of a binary image represented by binary image data (classification data), FIG. 3C illustrates an example of a smoothed image represented by smoothed image data, and FIG. 3D illustrates an example of a processed image represented by processed image data;

FIGS. 6A to 6D are second views respectively illustrating examples of images used in the image processing and a comparative example, in which FIG. 6A illustrates an enlarged view of an area including halftone dots which is extracted from the scan image represented by the scan data, FIG. 6B illustrates an enlarged view of the area including the halftone dots which is extracted from a minimum component image represented by minimum component data, FIG. 6C illustrates an enlarged view of the area including the halftone dots which is extracted from an inverted minimum component image represented by inverted minimum component data of a second embodiment and which is also extracted from a maximum component image represented by maximum component data of a third embodiment, and FIG. 6D illustrates an enlarged view of the area including the halftone dots which is extracted from a luminance image represented by luminance image data;

FIG. 9 is a flowchart illustrating steps in pixel classification processing executed by the multifunction peripheral according to the second embodiment;

DETAILED DESCRIPTION

A. First Embodiment

A-1: Configuration of Multifunction Peripheral 200

Figure 1:
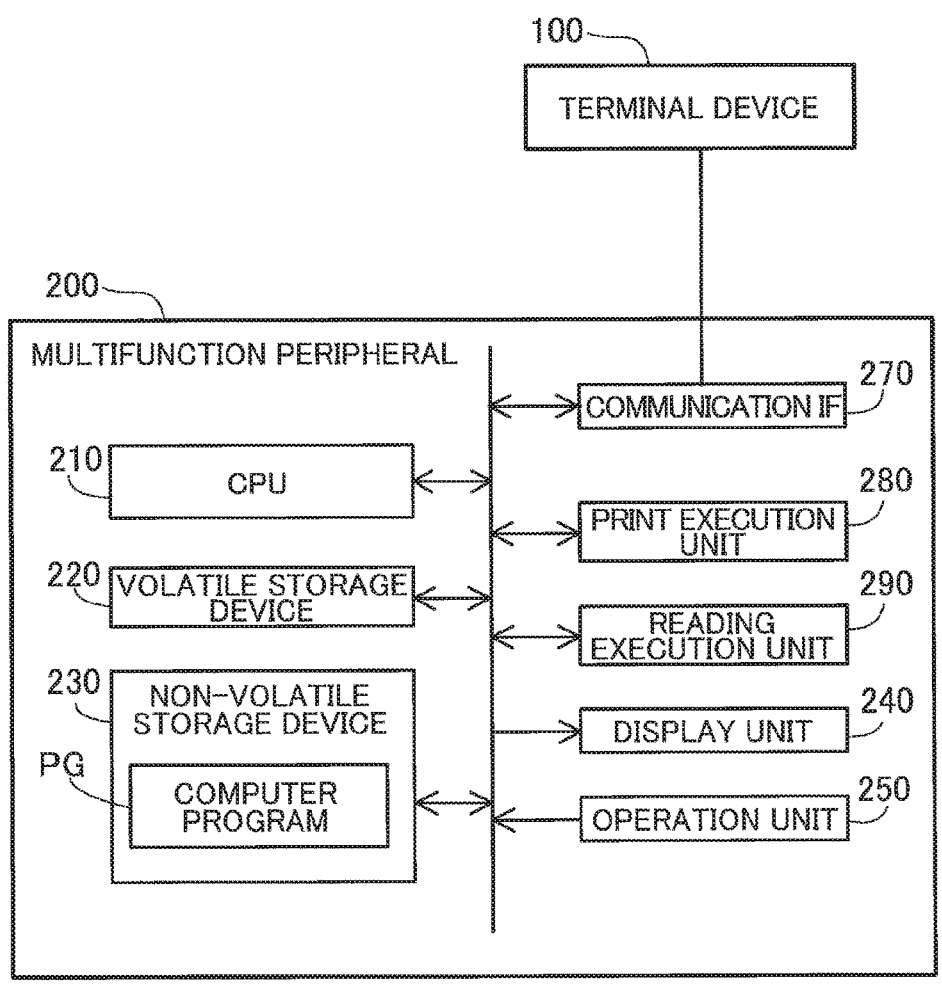
FIG. 1 is a block diagram illustrating a configuration of a multifunction peripheral according to embodiments of the present disclosure.

An image processing apparatus according to embodiments will be described while referring to the accompanying drawings wherein like parts and components are designated by the same reference numerals to avoid duplicating description. FIG. 1 is a block diagram illustrating the configuration of a multifunction peripheral 200 as an example of the image processing apparatus. The multifunction peripheral 200 includes a central processing unit (CPU) 210 which is a processor for controlling the multifunction peripheral 200, a volatile storage device 220 such as a dynamic random access memory (DRAM), a non-volatile storage device 230 such as a flash memory, a hard disk drive, or the like, a display unit 240 including a liquid crystal display and the like, an operating unit 250 including a touch panel and buttons superimposed on the liquid crystal display, an interface (communication IF) 270 for communicating with an external device such as a user terminal device 100, a print execution unit 280, and a reading execution unit 290.

The reading execution unit 290 optically reads an original using an image sensor according to control of the CPU 210 to generate scan data. The print execution unit 280 prints an image onto a print medium such as a paper sheet with a laser according to control of the CPU 210 by using a plurality of types of toner, specifically toner in the colors cyan (C), magenta (M), yellow (Y), and black (K), as coloring materials. More specifically, the print execution unit 280 exposes a photosensitive drum to form an electrostatic latent image and makes the toner adhere to the electrostatic latent image to thereby form a toner image. The print execution unit 280 transfers the toner image formed on the photosensitive drum onto the paper sheet. As a modification, the print execution unit 280 may be a print execution unit of an inkjet system that ejects ink as a coloring material to form an image onto the paper sheet.

The volatile storage device 220 provides a buffer area for temporarily storing various intermediate data generated when the CPU 210 performs processing. The non-volatile storage device 230 stores a computer program PG therein. The computer program PG is a control program allowing the CPU 210 to perform control of the multifunction peripheral 200. In the present first embodiment, the computer program PG is previously stored in the non-volatile storage device 230 at the time of manufacturing the multifunction peripheral 200. Alternatively, the computer program PG may be provided by being downloaded from a server or by being stored in a DVD-ROM and the like. The CPU 210 executes the computer program PG to thereby execute image processing to be described later.

A-2: Image Processing

Figure 2:
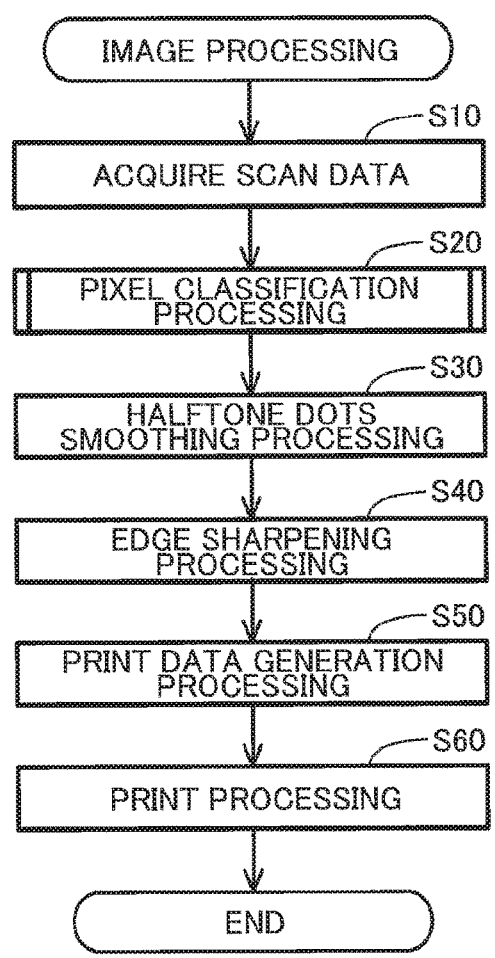
FIG. 2 is a flowchart illustrating steps in image processing executed by the multifunction peripheral according to the embodiments.

FIG. 2 is a flowchart illustrating steps in image processing. The image processing is executed when, for example, a user places an original on a platen of the reading execution unit 290 and the operation is made on the operation unit 250 to input a copy execution instruction. The image processing is processing that acquires scan data generated by the reading execution unit 290 reading the original and, from the scan data, generates print image data representing the original to thereby copy the original.

In S10, the CPU 210 reads the original placed on the platen by the user using the reading execution unit 290 to generate scan data as target image data. The original is a printed matter on which an image is printed by, for example, the multifunction peripheral 200 or an unillustrated printer. The generated scan data is stored in the buffer area of the volatile storage device 220 (FIG. 1). Thus, the CPU 210 acquires the scan data of the original as the target image data. The scan data includes a plurality of pixel values, and each pixel value represents the color of the pixel by an RGB value. That is, the scan data is RGB image data. The RGB value of one pixel includes three component values of, for example, red (R), green (G), and blue (B) (hereinafter, referred to also as "R value", "G value", and "B value"). In the present embodiment, the number of gradations of each component value is 256.

FIGS. 3A to 3D are first views each illustrating an example of an image used in the image processing. FIG. 3A illustrates an example of a scan image SI represented by the scan data. The scan image SI is made up of a plurality of pixels arranged in a matrix form in which the pixels are arranged in rows (first direction D1) and columns (second direction D2). The second direction D2 is orthogonal to the first direction D1.

The scan image SI illustrated in FIG. 3A includes a white background Bg1 representing the base color of the paper sheet of the original, three objects Ob1 to Ob3 different from characters (referred to also as "non-character objects Ob1 to Ob3"), four characters Ob4 to Ob7 (referred to also as "character objects Ob4 to Ob7"), and a background Bg2 of the four character objects Ob4 to Ob7. Each of the non-character objects is, for example, a photograph or a drawing. The background Bg2 is a uniform image having a color different from white.

In S20, the CPU 210 applies pixel classification processing to the scan data. The pixel classification processing is processing that classifies the plurality of pixels constituting the scan image SI into a plurality of edge pixels constituting edges and a plurality of non-edge pixels not constituting the edges.

As a result of the pixel classification processing, binary image data in which the pixel value of the edge pixel and the pixel value of the non-edge pixel (referred to also as "edge pixel value" and "non-edge pixel value") are, for example, "1" and "0", respectively, is generated. FIG. 3B illustrates an example of a binary image BI represented by the binary image data. In the binary image BI, a plurality of edge pixels constituting edges Eg1 to Eg7 of the respective objects Ob1 to Ob7 in the scan image SI and a plurality of edge pixels constituting an edge Eg8 as the boundary between the backgrounds Bg1 and Bg2 in the scan image SI are specified. Thus, the edges mainly include, for example, the edges of characters. The edges further include edges such as thin lines included in the non-character objects (for example, a drawing or a photograph). The binary image data is data representing a result of the pixel classification processing and is thus referred to also as "classification data". Details of the pixel classification processing will be described later.

In S30, the CPU 210 applies halftone dots smoothing processing to the scan data to generate smoothed image data representing a smoothed image. Specifically, the CPU 210 applies smoothing processing to each of the plurality of non-edge pixel values included in the scan data using a smoothing filter such as a Gaussian filter GF (to be described later) to calculate a plurality of non-edge pixel values that has been subjected to the smoothing processing (referred to also as "smoothed non-edge pixel values"). The non-edge pixel value to be subjected to the smoothing processing is specified by referring to the classification data generated in the classification processing of S20. The CPU 210 generates smoothed image data including the plurality of edge pixel values included in the scan data and the plurality of smoothed non-edge pixel values.

FIG. 3C illustrates an example of a smoothed image GI represented by the smoothed image data. The smoothed image GI includes a white background Bg1g, and objects Ob1g to Ob7g and a background Bg2g obtained by smoothing the objects Ob1 to Ob7 and background Bg2 in the scan image SI, respectively. Portions of the objects Ob1g to Ob7g and background Bg2g other than the edges thereof (referred to also as "non-edge portions") are smoother than those of the objects Ob1 to Ob7 and background Bg2 in the scan image SI illustrated in FIG. 3A.

In S40, the CPU 210 applies edge sharpening processing to the smoothed image data to generate processed image data. Specifically, the CPU 210 applies sharpening processing to each of the plurality of edge pixel values included in the smoothed image data using, for example, unsharp mask processing or sharpening filter application processing to calculate a plurality of edge pixel values that has been subjected to the sharpening processing (referred to also as "sharpened edge pixel values"). The edge pixel value to be subjected to the sharpening processing is specified by referring to the classification data generated in the classification processing of S20. The CPU 210 generates processed image data including the plurality of non-edge pixel values included in the smoothed image data (the plurality of smoothed non-edge pixel values) and the plurality of sharpened edge pixel values. The plurality of edge pixel values included in the smoothed image data have not been subjected to the smoothing processing and are thus the same as the plurality of edge pixel values included in the scan data. Therefore, it can be also said that the edge sharpening processing in this step is applied to the plurality of edge pixel values included in the scan data.

FIG. 3D illustrates an example of a processed image FI represented by the processed image data. The processed image FI includes a white background Bg1f, and objects Ob1f to Ob7f and a background Bg2f corresponding to the objects Ob1 to Ob7 and background Bg2 in the scan image SI, respectively. The edges of the objects Ob1f to Ob7f and background Bg2f in the processed image FI are sharper than those of the objects Ob1 to Ob7 and background Bg2 in the scan image SI illustrated in FIG. 3A, and those of the objects Ob1g to Ob7g and background Bg2g in the smoothed image GI illustrated in FIG. 3C.

As can be seen from the above description, the objects Ob1f to Ob7f and background Bg2f in the processed image FI include the sharpened edges and the smoothed non-edge portions.

In S50, the CPU 210 executes print data generation processing to generate print data using the processed image data. Specifically, the CPU 210 applies color conversion processing to the processed image data which is RGB image data to thereby generate CMYK image data representing the color of each pixel by a CMYK value which is a color value having color components (components of C, M, Y, and K) corresponding to color materials used in printing. The color conversion processing is executed by referring to, for example, a known look-up table. Halftone processing is applied to the CMYK image data to generate dot data indicating a dot formation state for each color material to be used in printing and for each pixel. The dot formation state may include, for example, two states of "dot" and "no dot" or four states of "large dot", "medium dot", "small dot", and "no dot". The halftone processing is executed according to, for example, a dither method or an error diffusion method. The CPU 210 rearranges the dot data in an order to be used in printing and adds a printing command to the rearranged dot data to thereby generate print data.

In S60, the CPU 210 executes the print processing and ends the image processing. Specifically, the CPU 210 supplies the print data to the print execution unit 280 to make the print execution unit 280 print the processed image.

According to the image processing described above, first image processing (specifically, the sharpening processing) is applied to the plurality of edge pixel values that has been specified in the scan data (S40), and second image processing (specifically, the smoothing processing) different from the first image processing is applied to the plurality of non-edge pixel values that has been specified in the scan data (S30), whereby the processed image data is generated. Thus, a plurality of types of image processing which is mutually different is applied to the pixel values of the edge pixels (edge pixel values) and the pixel values of the pixels different from the edge pixels (non-edge pixel values), respectively, so that the image processing is adequately applied to the scan data. As a modification, the edge sharpening processing of S40 may be executed prior to the halftone dots smoothing processing of S30.

More specifically, the processed image data including the plurality of sharpened edge pixel values and the plurality of smoothed non-edge pixel values is generated (S30, S40). As a result, the processed image data representing the good-looking processed image FI can be generated.

For example, in the processed image data, values that have been subjected to the sharpening processing are used for the edge pixel values constituting the edges of the objects and the like, as illustrated in the processed image FI of FIG. 3D. As a result, the edges in the processed image FI look sharp, so that the processed image FI to be printed can be improved in appearance, for example.

Further, in the processed image data, pixel values that have been subjected to the smoothing processing (i.e., smoothed pixel values) are used for the pixel values of the non-edge pixels constituting a uniform portion such as the background Bg2 in the processed image FI or a non-edge portion of the object. As a result, for example, a periodic component that may cause moire can be suppressed from appearing at the non-edge portions in the processed image FI, which can suppress problems such as moire from occurring in the processed image FI to be printed. Accordingly, the processed image FI to be printed can be improved in appearance.

For example, the original used in generating the scan data is a printed matter on which an image is printed. Thus, at the level of dots constituting an image, halftone dots are formed in a uniform portion, such as the background Bg2, having a color different from white in the original. The halftone dots include a plurality of dots and a portion having no dot (portion representing the base color of the original). Therefore, at the pixel level, the halftone dots are formed in an area representing the background Bg2 in the scan image SI. The dots in the halftone dots are arranged with periodicity due to influence of a dither matrix and the like used in printing the original. Therefore, when printing is performed using the scan data, moire is likely to appear due to interference between the periodic component of the dot pattern in the halftone dots existing in the original image (scan image SI) before the halftone processing and the periodic component of the dot pattern in the halftone dots constituting a printing image. In the processed image FI of the present embodiment, the periodic component of the dot pattern constituting a portion other than the edges in the original image (scan image SI) is reduced by the smoothing processing. As a result, when the processed image FI is printed using the processed image data, problems such as moire can be suppressed from occurring in the processed image FI to be printed.

Particularly, in the image processing described above, print data is generated using the processed image data (S50). Accordingly, for example, adequate print data capable of suppressing moire which is likely to occur in the processed image FI to be printed can be generated.

Further, in the image processing described above, scan data generated using the image sensor is acquired as the target image data (S10). Accordingly, adequate processed image data in which a periodic component of the scan data which is likely to contain the periodic component contained in the original is reduced can be generated.

A-3: Pixel Classification Processing

Figure 4:
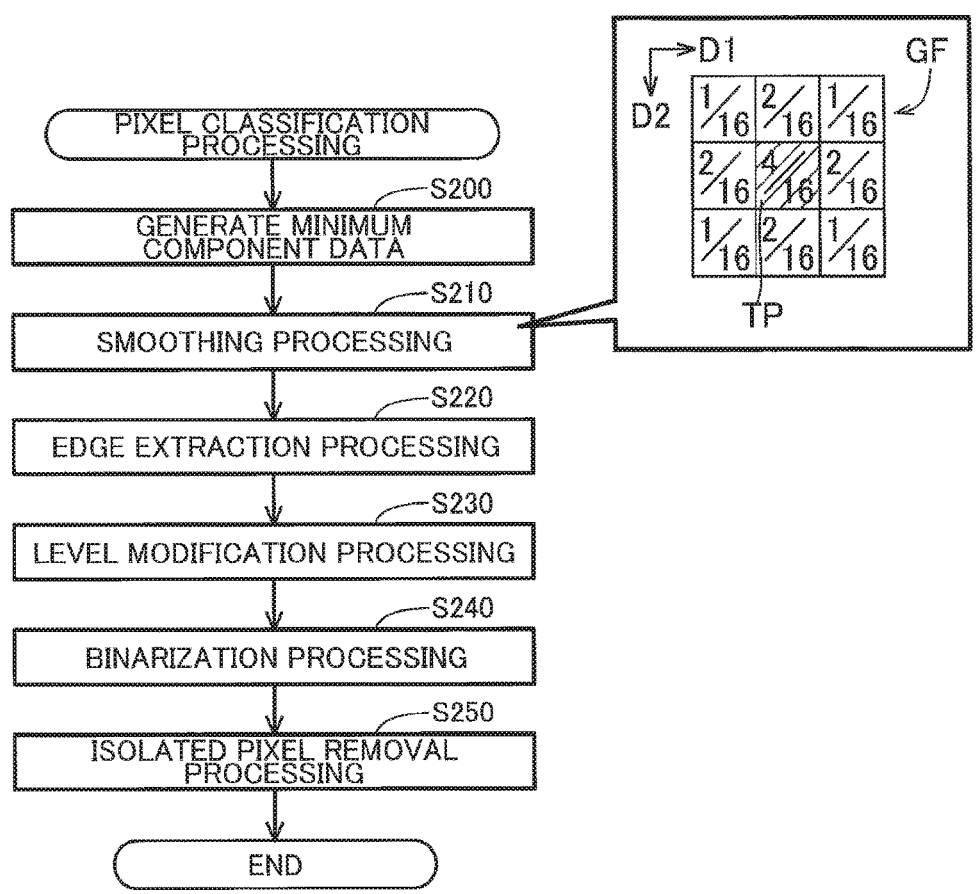
FIG. 4 is a flowchart illustrating steps in pixel classification processing executed by the multifunction peripheral according to a first embodiment.
Figure 5A:
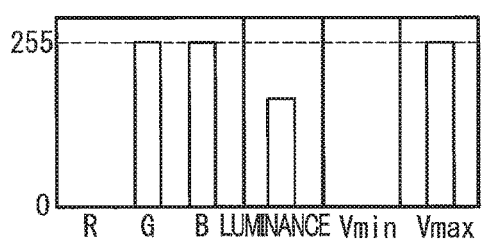
FIG. 5A is an explanatory view illustrating RGB values, a luminance, a minimum component value, and a maximum component value of cyan in the scan data by bar graphs.
Figure 5D:
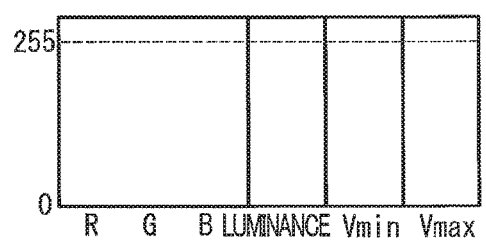
FIG. 5D is an explanatory view illustrating RGB values, a luminance, a minimum component value, and a maximum component value of black in the scan data by bar graphs.
Figure 5B:
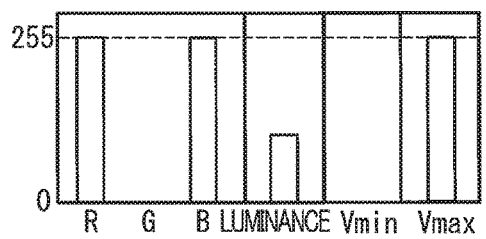
FIG. 5B is an explanatory view illustrating RGB values, a luminance, a minimum component value, and a maximum component value of magenta in the scan data by bar graphs.
Figure 5E:
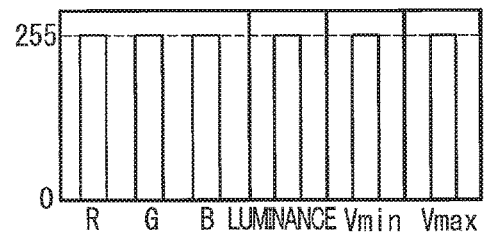
FIG. 5E is an explanatory view illustrating RGB values, a luminance, a minimum component value, and a maximum component value of white in the scan data by bar graphs.
Figure 5C:
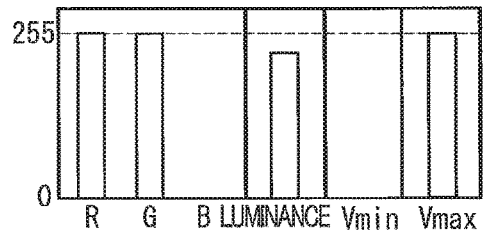
FIG. 5C is an explanatory view illustrating RGB values, a luminance, a minimum component value, and a maximum component value of yellow in the scan data by bar graphs.

The pixel classification processing executed in S20 of FIG. 2 will be described. FIG. 4 is a flowchart illustrating steps in the pixel classification processing. In S200, the CPU 210 generates minimum component data using the scan data. Specifically, the CPU 210 acquires a minimum component value Vmin from each of a plurality of pixel values (RGB value) included in the scan data. That is, the CPU 210 acquires a plurality of minimum component values Vmin corresponding to respective ones of the plurality of pixels included in the scan image SI. Each of the minimum component values Vmin is the minimum value among a plurality of component values (R value, G value, and B value) of the corresponding pixel. The CPU 210 generates, as the minimum component data, image data including a plurality of minimum component values Vmin as the plurality of pixel values. The minimum component data is image data representing an image having the same size as that of the scan image SI. Each of the plurality of pixel values included in the minimum component data is the minimum component value Vmin among the component values of the corresponding pixel value (RGB value) included in the scan data.

FIGS. 5A to 5E are explanatory views of minimum and maximum component values in the scan data. FIGS. 5A to 5E illustrate the RGB values of respective cyan (C), magenta (M), yellow (Y), black (K), and white (W) by bar graphs. As illustrated in FIGS. 5A to 5E, the RGB values (denoted by R, G, and B in FIGS. 5A to 5E) of the respective C, M, Y, K, and W are (0, 255, 255), (255, 0, 255), (255, 255, 0), (0, 0, 0), and (255, 255, 255).

A luminance Y of each of the RGB values of respective C, M, Y, K, and W can be calculated using the following expression: $Y=0.299 \times R+0.587 \times G+0.114 \times B$. The luminances Y (represented by values of 0 to 255) of the respective C, M, Y, K, and W are 186, 113, 226, 0, 255, approximately, which are mutually different values (FIGS. 5A to 5E). On the other hand, the minimum component values Vmin of the respective C, M, Y, K, and W are 0, 0, 0, 0, and 255 as illustrated in FIGS. 5A to 5E. That is, the minimum component values Vmin are the same value except for that of white (W).

Figure 6A:
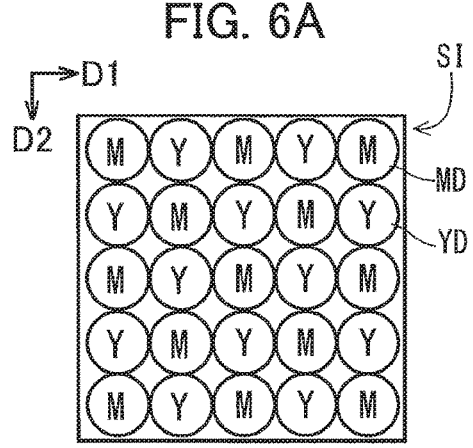

FIGS. 6A to 6D are second views each illustrating an example of an image used in the image processing. FIG. 6A is an enlarged view of an area including the above-described halftone dots which is extracted from the scan image SI. In the example of FIG. 6A, for example, the halftone dots area in the scan image SI includes a plurality of M dots MD and a plurality of Y dots YD. Here, for the purpose of illustration, it is assumed that an image representing the M dot MD is a uniform image having the primary color of magenta and that an image representing the Y dot YD is a uniform image having the primary color of yellow.

Figure 6C:
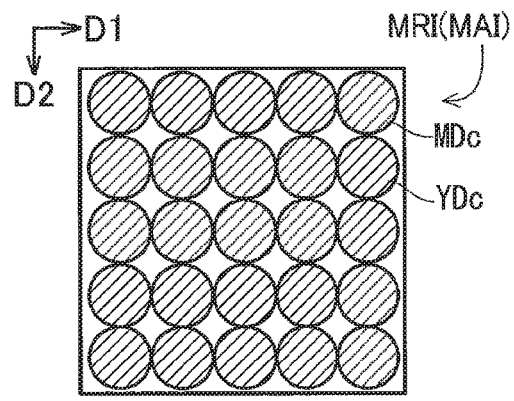
Figure 6B:
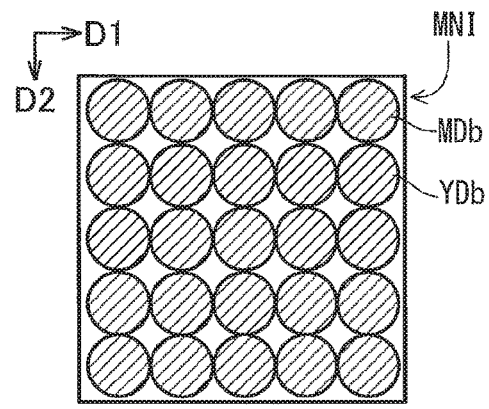
Figure 6D:
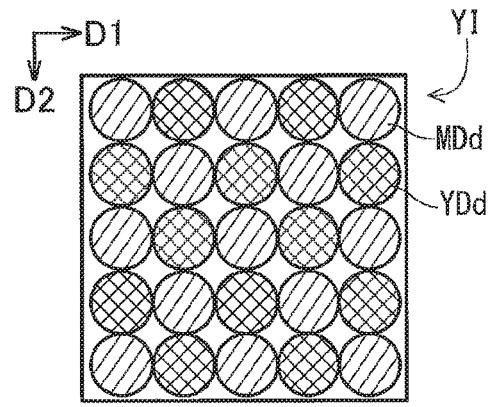

FIG. 6B illustrates an example of a minimum component image MNI represented by the minimum component data. The minimum component image MNI corresponds to the scan image SI of FIG. 6A. In the minimum component image MNI, the pixel value in an area MDb corresponding to the M dot MD in the scan image SI and the pixel value in an area YDb corresponding to the Y dot YD are the same as each other. FIG. 6D illustrates, as a comparative example, a luminance image YI represented by luminance image data indicative of the luminance of each of the pixels. The luminance image YI corresponds to the scan image SI of FIG. 6A. Unlike in the case of the minimum component image MNI of FIG. 6B, in the luminance image YI, the pixel value in an area MDd corresponding to the M dot MD in the scan image SI and the pixel value in an area YDd corresponding to the Y dot YD differ from each other.

As can be seen from the above description, differences among the plurality of pixel values in an area corresponding to a portion of the scan image SI where any of C, M, Y, and K dots are formed in the original are smaller in the minimum component image MNI than those in the luminance image YI. Further, in the minimum component image MNI, the pixel values in the base color area corresponding to a portion of the scan image SI that represents the base color (white color of the paper sheet) in the original are larger than the pixel values in an area corresponding to a portion of the scan image SI where dots are formed in the original.

In S210, the CPU 210 applies smoothing processing to smooth the minimum component image MNI represented by the minimum component data to the generated minimum component data to thereby generate smoothed minimum component data. Specifically, the CPU 210 applies a predetermined smoothing filter (in the present embodiment, the Gaussian filter GF illustrated in FIG. 4) to the pixel values constituting the minimum component data to calculate the smoothed pixel values. The Gaussian filter GF specifies coefficients within a predetermined filter range, specifically, coefficients corresponding to respective ones of nine pixels of three-by-three pixels arranged in a matrix form in which the pixels are arranged in rows (horizontal direction) and columns (vertical direction). Note that the horizontal direction and vertical direction correspond to the first direction D1 and second direction D2 illustrated in FIGS. 3A to 3D, respectively. Hereinafter, for the purpose of illustration, the upstream and downstream sides in the first direction D1 will be described as the left and right, respectively, and the upstream and downstream sides in the second direction D2 will be described as the top and bottom, respectively. In other words, the Gaussian filter GF specifies one coefficient corresponding to a target pixel TP and coefficients corresponding to eight peripheral pixels including four pixels adjacent to the left, right, top, and bottom of the target pixel TP. The coefficient corresponding to the target pixel TP is (4/16). The coefficients corresponding to the four pixels adjacent to the left, right, top, and bottom of the target pixel TP are (2/16), and coefficients corresponding to the four pixels positioned at the lower right, lower left, upper right, and upper left of the target pixel TP are (1/16). The CPU 210 multiplies the respective pixel values of nine pixels within the filter range including the target pixel TP and its peripheral pixels by their corresponding coefficients specified in the Gaussian filter GF to calculate nine modified values. Then, the CPU 210 calculates the sum of the nine modified values as the smoothed pixel value of the target pixel TP.

In S220, the CPU 210 applies edge extraction processing to the smoothed minimum component data to extract edges in the smoothed minimum component image MNI represented by the smoothed minimum component data to thereby generate edge strength data. Specifically, the CPU 210 applies a so-called Sobel filter to the pixel values constituting the smoothed minimum component data to calculate edge strengths Se. The CPU 210 generates edge strength data in which the plurality of pixel values is represented by the edge strengths Se.

The following shows a calculation expression (1) of the edge strength. A gradation value $P(x, y)$ in the expression (1) indicates the gradation value of a specific pixel position (x, y) in the scan image SI. The position x indicates a pixel position in the first direction D1, and the position y indicates a pixel position in the second direction D2. An edge strength $Se(x, y)$ at the pixel position (x, y) in the scan image SI is calculated using nine pixel values of three-by-three pixels in rows and columns centered on the pixel position(x, y). The first and second terms in the calculation expression (1) are each the absolute value of the sum of the values obtained by multiplying the gradation values of the pixels at the nine positions by their corresponding coefficients. The first term is a differential of the gradation value in the first direction D1 (i.e., differential in the horizontal direction), and the second term is a differential of the gradation value in the second direction D2 (i.e., differential in the vertical direction). The calculated edge strength $Se(x, y)$ is normalized to 256 gradation values from 0 to 255.

$$Se(x, y) = \left\| \begin{bmatrix} -1 & 0 & 1 \\ -2 & 0 & 2 \\ -1 & 0 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| + \left\| \begin{bmatrix} -1 & -2 & -1 \\ 0 & 0 & 0 \\ 1 & 2 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| \quad (1)$$

In an edge strength image represented by the generated edge strength data, the pixel values of the pixels at the positions corresponding to the edges in the scan image SI, i.e., the pixel values of the pixels at the positions corresponding to the edges Eg1 to Eg8 in the binary image BI of FIG. 3B are larger than pixel values of pixels at the other positions.

In S230, the CPU 210 applies level modification processing to the edge strength data to generate modified edge strength data. The level modification processing is modification processing to extend a specific range within the range of the gradation values that the pixel values constituting the edge strength data can take (in the present embodiment, values from 0 to 255).

Figure 7:
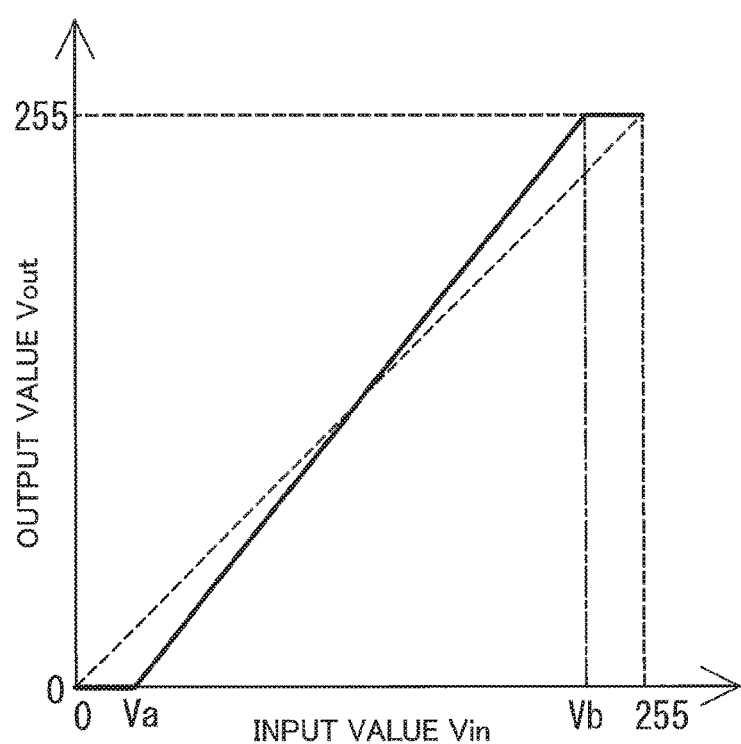
FIG. 7 is a view illustrating an example of a tone curve for use in level modification processing.

FIG. 7 is a view illustrating an example of a tone curve for use in the level modification processing. Specifically, the CPU 210 applies the tone curve illustrated in FIG. 7 to the pixel values constituting the edge strength data. More specifically, each of the pixel values is taken as an input value Vin, and an output value Vout corresponding to the input value Vin on the tone curve is taken as a converted value. As a result, pixel values equal to or greater than a threshold Vb (for example, 245) are all converted into the maximum value (255), and pixel values equal to or smaller than a threshold Va (for example, 10) are all converted into the minimum value (0). Thus, the range of pixel values greater than the threshold Va and smaller than the threshold Vb is extended to the range from 0 to 255. Stated differently, in a case where a first edge strength is a pixel value in a range from 0 to Va, a second edge strength is a pixel value in a range from Va to Vb, and a third edge strength is a pixel value in a range from Vb to 255, the level modification processing modifies the first, and third edge strengths into 0 and 255, respectively, whereas the second edge strength into a modified value falling within and distributable over the full range from 0 to 255.

In S240, the CPU 210 applies binarization processing to the modified edge strength data to generate binary image data. For example, in the modified edge strength data, the CPU 210 classifies pixels having a pixel value (i.e., edge strength) equal to or greater than a threshold (for example, 128) into edge pixels, and classifies pixels having a pixel value smaller than the threshold into non-edge pixels. As described above, in the binary image data, the edge pixel value and non-edge pixel value are "1" and "0", respectively.

In S250, the CPU 210 applies isolated pixel removal processing to the binary image data. The isolated pixel removal processing is processing to remove isolated edge pixels and isolated non-edge pixels from the binary image data. The CPU 210 thereby generates binary image data that has been subjected to the isolated pixel removal processing (referred to also as "removed binary image data").

Figure 8A:
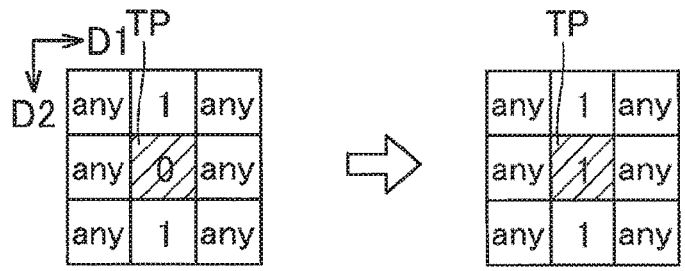
FIGS. 8A to 8D are explanatory views for explaining isolated pixel removal processing.
Figure 8B:
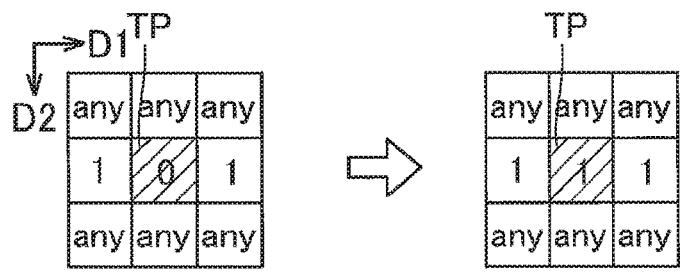
Figure 8C:
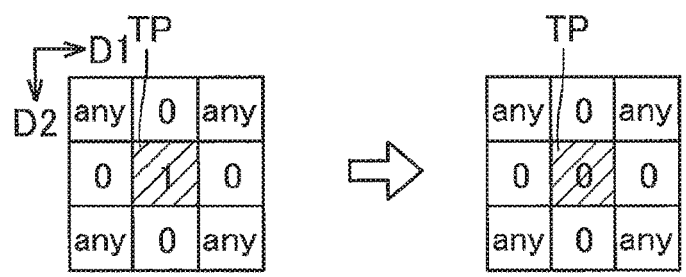
Figure 8D:
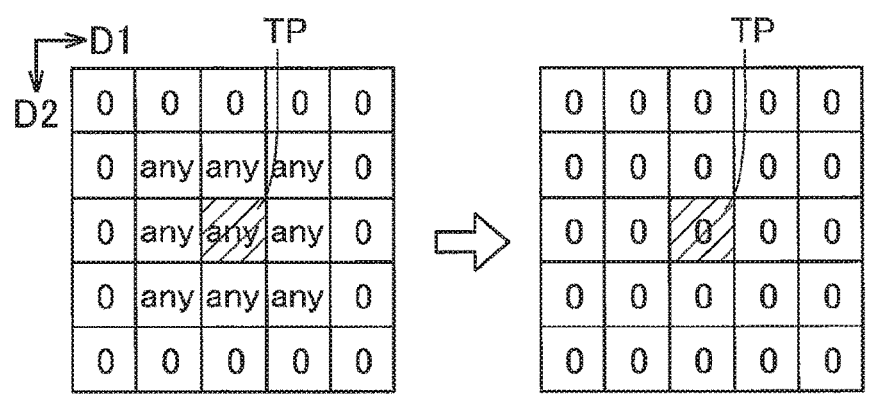
Figure 10A:
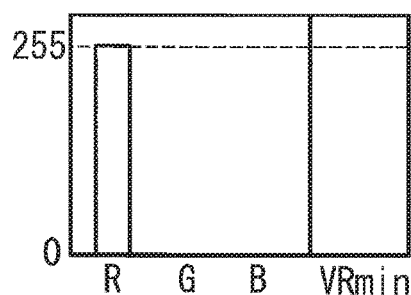
FIG. 10A is an explanatory view illustrating inverted color values and an inverted minimum component value of cyan in the scan data by bar graphs.
Figure 10D:
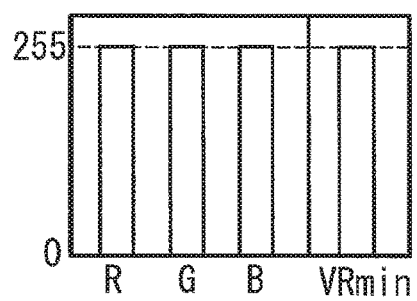
FIG. 10D is an explanatory view illustrating inverted color values and an inverted minimum component value of black in the scan data by bar graphs.
Figure 10B:
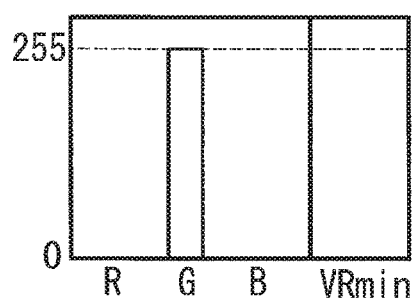
FIG. 10B is an explanatory view illustrating inverted color values and an inverted minimum component value of magenta in the scan data by bar graphs.
Figure 10E:
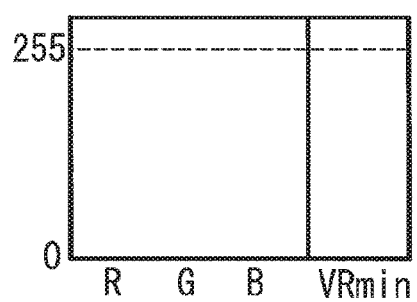
FIG. 10E is an explanatory view illustrating inverted color values and an inverted minimum component value of white in the scan data by bar graphs.
Figure 10C:
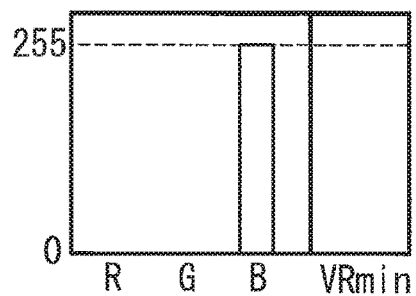
FIG. 10C is an explanatory view illustrating inverted color values and an inverted minimum component value of yellow in the scan data by bar graphs.

FIGS. 8A to 8D are explanatory views for explaining the isolated pixel removal processing. FIGS. 8A to 8C each illustrates nine pixel values of three-by-three pixels arranged in a matrix form in which the pixels are arranged in rows (first direction D1) and columns (second direction D2) with a target pixel TP as the center, and FIG. 8D illustrates twenty-five pixel values of five-by-five pixels arranged in a matrix form in which the pixels are arranged in rows (first direction D1) and columns (second direction D2) with a target pixel TP as the center. The CPU 210 sets the target pixel TP one by one from a plurality of pixels in the binary image represented by the binary image data, and determines whether or not the pixel values within a predetermined range centered on the target pixel TP have a specific pattern illustrated on the left side in each of FIGS. 8A to 8D. In each of FIGS. 8A to 8D, a pixel having a pixel value of "1" indicates the edge pixel, a pixel having a pixel value of "0" indicates the non-edge pixel, and a pixel having a pixel value of "any" indicates either the edge pixel or the non-edge pixel.

The pattern illustrated on the left side of FIG. 8A is a pattern in which the target pixel TP is the non-edge pixel, and two pixels adjacent to the top and bottom of the target pixel TP are the edge pixels. The pattern illustrated on the left side of FIG. 8B is a pattern in which the target pixel TP is the non-edge pixel and two pixels adjacent to the left and right of the target pixel TP are the edge pixels. When the pixel values within a predetermined range have the pattern illustrated on the left side of FIG. 8A or FIG. 8B, the CPU 210 changes the target pixel TP from the non-edge pixel to the edge pixel as illustrated on the right side of FIG. 8A or FIG. 8B.

The pattern illustrated on the left side of FIG. 8C is a pattern in which the target pixel TP is the edge pixel, and four pixels adjacent to the left, right, top, and bottom of the target pixel TP are the non-edge pixels. When the pixel values within a predetermined range have the pattern illustrated on the left side of FIG. 8C, the CPU 210 changes the target pixel TP from the edge pixel to the non-edge pixel as illustrated on the right side of FIG. 8C.

The pattern illustrated on the left side of FIG. 8D is a pattern in which sixteen pixels adjacent to the outside of the range of nine pixels of three-by-three pixels are all the non-edge pixels. The nine pixels of three-by-three pixels are arranged in a matrix form in which the pixels are arranged in rows (first direction D1) and columns (second direction D2) with the target pixel TP as the center, and the sixteen pixels surrounds the nine pixels. When the pixel values within a predetermined range have the pattern illustrated on the left side of FIG. 8D, the CPU 210 sets all the nine pixels of three-by-three pixels centered on the target pixel TP to the non-edge pixels as illustrated on the right side of FIG. 8D.

The binary image data that has been subjected to the isolated pixel removal processing (i.e., removed binary image data) generated in S250 is final classification data generated in the pixel classification processing, that is, binary image data to be referred to for specifying the edge pixel and non-edge pixel in S30 and S40 of FIG. 2.

According to the first embodiment described above, the CPU 210 generates the minimum component data including a plurality of corresponding values respectively corresponding to the plurality of pixel values included in the scan data (S200 of FIG. 4). Each of the plurality of corresponding values included in the minimum component data is the minimum component value Vmin. Then, the CPU 210 applies the edge extraction processing to the minimum component data to generate the edge strength data (S220 of FIG. 4). The CPU 210 applies edge pixel specifying processing including processing of binarizing the edge strength data (S240 of FIG. 4) to thereby specify the plurality of edge pixels in the scan image SI (S240 and S250 of FIG. 4). In the minimum component data, differences among the pixel values can be reduced in a portion not including the edge pixels to be specified, for example, in a halftone dots area representing a uniform image from a macroscopic perspective (see FIGS. 6A to 6D). As a result, pixels different from the edge pixel can be prevented from being erroneously specified as the edge pixel when the CPU 210 specifies edge pixels by executing the subsequent edge extraction processing (S220) and edge pixel specifying processing (S240 and S250). Thus, the accuracy of specifying the edge pixels in the scan image SI can be improved.

Particularly, when the target image data includes a halftone dots area in the scan image SI like the scan data of the embodiment described above, differences among the plurality of pixel values representing C, M, Y, and K dots included in the halftone dots area can be reduced, as described using FIGS. 6A to 6D. More specifically, five types of elements of the C, M, Y, and K dots and the base color (white) of the paper sheet constitute the halftone dots area. In the present embodiment, out of these five types of elements, differences among the pixel values representing four types of elements can be reduced. For example, the edge pixel should not be detected in an area which is observed as the halftone dots area when viewed at the pixel level (when viewed from a microscopic perspective capable of recognizing individual dots constituting the halftone dots area) and which is observed as a uniform area when viewed from an observer's perspective (when viewed from a macroscopic perspective incapable of recognizing individual dots constituting the halftone dots area). In the present embodiment, it can be suppressed that edge pixels are erroneously specified in such an area. Specifically, it can be suppressed that edge pixels are erroneously specified in a uniform area such as the background Bg2 in the scan image SI or a portion other than the edges of the object.

It is often the case that when a character exists in an image, the character has a dark color and its background has a light color, or vice versa. Accordingly, one of the character and background may include a relatively large amount of portions representing the base color (white) of the paper sheet, and the other one thereof may include a relatively large amount of portions representing any of C, M, Y, and K dots. As illustrated in FIGS. 5A to 5E, in the minimum component data, large differences exist between the pixel values in a portion representing any of C, M, Y, and K dots and the pixel values in a portion representing the base color (white) of the paper sheet. Thus, it is more likely that when edge pixels are specified using the minimum component data, the edge pixels constituting the edge of the character can be adequately specified. Particularly, yellow (Y) is lower in density (higher in luminance) than C, M, and K. Thus, if the luminance image YI is binarized in a case where a character having a yellow color exists on the background having the base color (white) of the paper sheet, the edge pixels constituting the edge of the yellow character may not be adequately specified. In the present embodiment, even in such a case, the edge pixels constituting the yellow character can be adequately specified. Thus, according to the present embodiment, the edge pixels constituting the edge of the character can be adequately specified and, at the same time, it can be suppressed that edge pixels are erroneously specified in a uniform portion or a portion other than the edge. As a result, the accuracy of specifying the edge pixels in the scan image SI can be improved.

Further, according to the embodiment described above, the CPU 210 applies the smoothing processing to the minimum component data to generate the smoothed minimum component data (S210 of FIG. 4). The CPU 210 then applies the edge extraction processing to the smoothed minimum component data to generate the edge strength data (S220 of FIG. 4). As a result, by executing the smoothing processing, it is possible to further suppress differences among the pixel values in a portion which does not include an edge pixel to be specified in the minimum component image MNI (a uniform portion or a portion different from an edge). For example, in the halftone dots area of the scan image SI, a portion representing the dot does not always have the primary color of C, M, Y, or K due to overlap of the dots of C, M, Y, and K, blurring at the time of reading by the reading execution unit 290, or the like. Therefore, in the minimum component image MNI, differences among a plurality of pixel values representing C, M, Y, and K dots are small but not zero. Application of the smoothing processing allows the above-described differences among the pixel values to be further reduced. As a result, it can be prevented that a pixel different from the edge pixel is erroneously specified as the edge pixel.

Further, according to the embodiment described above, the CPU 210 applies the level modification processing to the edge strength data to generate modified edge strength data (S230 of FIG. 4). The CPU 210 then executes the edge pixel specifying processing including the processing of binarizing the modified edge strength data (S240 and S250). As described above, the binarization processing is executed after the range including the binarization threshold values (range greater than the threshold value Va of FIG. 7 and smaller than the threshold value Vb) is extended, so that the accuracy of binarization can be improved. As a result, the accuracy of specifying the edge pixels in the scan image SI can be improved.

Further, according to the embodiment described above, the CPU 210 executes the processing of binarizing the edge strength data (modified edge strength data) in S240 of FIG. 4 and then executes the isolated pixel removal processing including the processing of removing the isolated edge pixels (FIGS. 8C and 8D) in S250. In other words, in S240, a plurality of candidate pixels is specified as candidates of the plurality of edge pixels. Then, in S250, the final edge pixels are specified by removing the isolated candidate pixels from the plurality of candidate pixels. As described using FIGS. 6A to 6D, the difference between the pixel value representing C, M, Y, or K dot and the pixel value representing white of the base color is large. Thus, in a halftone dots area having a uniform and relatively dark color, a pixel having white of the base color may be erroneously detected as an edge pixel, or in a portion having a uniform and light color, a pixel having white of the base color may be erroneously detected as an edge pixel. In such a case, the pixel to be erroneously detected as the edge pixel is often isolated. Further, the isolated pixel to be detected as the edge pixel is very unlikely to actually constitute the edge. Thus, the pixel to be erroneously detected as the edge pixel can be adequately removed by executing the isolated pixel removal processing. As a result, the accuracy of specifying the edge pixels can be further improved.

Further, in the embodiment described above, the isolated pixel removal processing includes the processing of removing the isolated non-edge pixels (FIGS. 8A and 8B), in addition to the processing of removing the isolated edge pixels. Thus, it can be prevented that an edge of a character or the like is broken due to existence of the non-edge pixel in a portion constituting the edge of the character or the like.

Further, in the present embodiment, the pixel values constituting the scan data are each represented by a color value (RGB value) of the RGB color system. In the RGB color system, the minimum component values Vmin of the respective values representing C, M, Y, and K colors are the same as each other in principle. As a result, differences among the plurality of pixel values representing C, M, Y, and K dots can be adequately reduced.

B. Second Embodiment

In a second embodiment, pixel classification processing different from that in the first embodiment is executed. Other image processing procedures executed in the second embodiment are the same as those in the first embodiment. FIG. 9 is a flowchart illustrating steps in the pixel classification processing of the second embodiment.

In S300, the CPU 210 generates the minimum component data using the scan data as in S200 of FIG. 4. In S310, the CPU 210 applies the processing of S210 to S250 of FIG. 4 to the minimum component data. Thus, as in the pixel classification processing of the first embodiment, the binary image data that has been subjected to the isolated pixel removal processing and represents the edge and non-edge pixels (removed binary image data) is generated. The removed binary image data generated in S310 is referred to also as "first binary image data". Further, the edge pixel represented by the first binary image data is referred to as a "first edge pixel" and the non-edge pixel represented by the first binary image data is referred to as a "first non-edge pixel".

In S320, the CPU 210 generates inverted image data using the scan data. Specifically, the CPU 210 inverts the plurality of component values of the RGB color (R value, G value, and B value) to generate an inverted RGB color value for each of the plurality of pixel values (RGB values) included in the scan data. Assuming that an RGB value before inversion is represented by (Rin, Gin, Bin), an inverted RGB value (Rout, Gout, Bout) is expressed by the following expressions (2) to (4):

$$Rout = Rmax - Rin \quad (2)$$

$$Gout = Gmax - Gin \quad (3)$$

$$Bout = Bmax - Bin \quad (4)$$

The Rmax, Gmax, and Bmax in the above expressions are the maximum values that the respective R value, G value, and B value can take. In the present embodiment, Rmax, Gmax, and Bmax are all 255. The CPU 210 generates, as the inverted image data, image data which includes, as a plurality of pixel values, a plurality of inverted color values corresponding to respective ones of the plurality of pixels.

In S330, the CPU 210 generates inverted minimum component data using the inverted image data. Specifically, the CPU 210 acquires the minimum component value VRmin from each of the plurality of pixel values (RGB values) included in the inverted image data. The minimum component value VRmin is the minimum value among the plurality of component values (R value, G value, and B value) included in the RGB value. The minimum component value VRmin of the inverted image data is referred to also as "inverted minimum component value VRmin of the scan data". The CPU 210 generates inverted minimum component data which includes, as a plurality of pixel values, a plurality of inverted minimum component values VRmin corresponding to respective ones of the plurality of pixels. The inverted minimum component data is image data representing an image having the same size as that of the scan image SI. Each of the plurality of pixel values included in the inverted minimum component data is the inverted minimum component value VRmin of the corresponding one of the plurality of pixel values (RGB values) in the scan data.

FIGS. 10A to 10E are explanatory views of the inverted color values of the scan data and the inverted minimum component values VRmin. FIGS. 10A to 10E illustrate the RGB values which are the inverted color values of respective C, M, Y, K, and W by bar graphs. As illustrated in FIGS. 10A to 10E, the RGB values (R, G, and B) which are the inverted color values of the respective cyan, magenta, yellow, black, and white are (255, 0, 0), (0, 255, 0), (0, 0, 255), (255, 255, 255), and (0, 0, 0). Thus, the inverted minimum component values VRmin of respective C, M, Y, K, and W are 0, 0, 0, 255, and 0, as illustrated in FIGS. 10A to 10E. That is, the inverted minimum component values VRmin are the same value except for that of black (K).

FIG. 6C illustrates an example of an inverted minimum component image MRI represented by the inverted minimum component data. The inverted minimum component image MRI corresponds to the scan image SI of FIG. 6A. In the inverted minimum component image MRI, the pixel value in an area MDc corresponding to the M dot MD in the scan image SI and the pixel value in an area YDc corresponding to the Y dot YD in the scan image SI are the same as each other, as in the minimum component image MNI of FIG. 6B.

As can be seen from the above description, the difference between the plurality of pixel values in an area of the scan image SI where any of chromatic color dots (C, M, and Y dots) are formed in the original and the plurality of pixel values in a portion of the scan image SI that represents white of the base color in the original is smaller in the inverted minimum component image MRI than that in the luminance image YI. Further, in the inverted minimum component image MRI, the pixel values in an area of the scan image SI where K dots are formed are larger than the pixel values in an area of the scan image SI where chromatic dots are formed in the original or the pixel values in a portion of the scan image SI that represents white of the base color in the original.

In S340 of FIG. 9, the CPU 210 applies the processing of S210 to S250 of FIG. 4 to the inverted minimum component data. That is, the CPU 210 applies the smoothing processing to the inverted minimum component data to smooth the inverted minimum component image MRI represented by the inverted minimum component data. The CPU 210 thereby generates smoothed inverted minimum component data. The CPU 210 secondly applies the edge extraction processing to the smoothed inverted minimum component data to extract edges in the smoothed inverted minimum component image MRI represented by the smoothed inverted minimum component data. In other words, the CPU 210 calculates edge strengths of the smoothed inverted minimum component image MRI. The CPU 210 thereby generates edge strength data. The CPU 210 then applies the level modification processing to the edge strength data to thereby generate modified edge strength data. The CPU 210 next applies the binarization processing to the modified edge strength data to thereby generate binary image data. The CPU 210 finally applies the isolated pixel removal processing to the binary image data to thereby generate binary image data that has been subjected to the isolated pixel removal processing (i.e., removed binary image data). As a result, binary image data representing the edge and non-edge pixels is generated. The removed binary image data generated in S340 is referred to also as "second binary image data". Further, the edge pixel represented by the second binary image data is referred to as a "second edge pixel", and the non-edge pixel represented by the second binary image data is referred to as a "second non-edge pixel".

In S350, the CPU 210 generates classification data representing finally specified edge and non-edge pixels using the first binary image data generated in S310 and second binary image data generated in S340. Specifically, the CPU 210 takes the logical sum of the pixel values in the first and second binary image data to thereby generate binary image data as the classification data.

Figure 11:
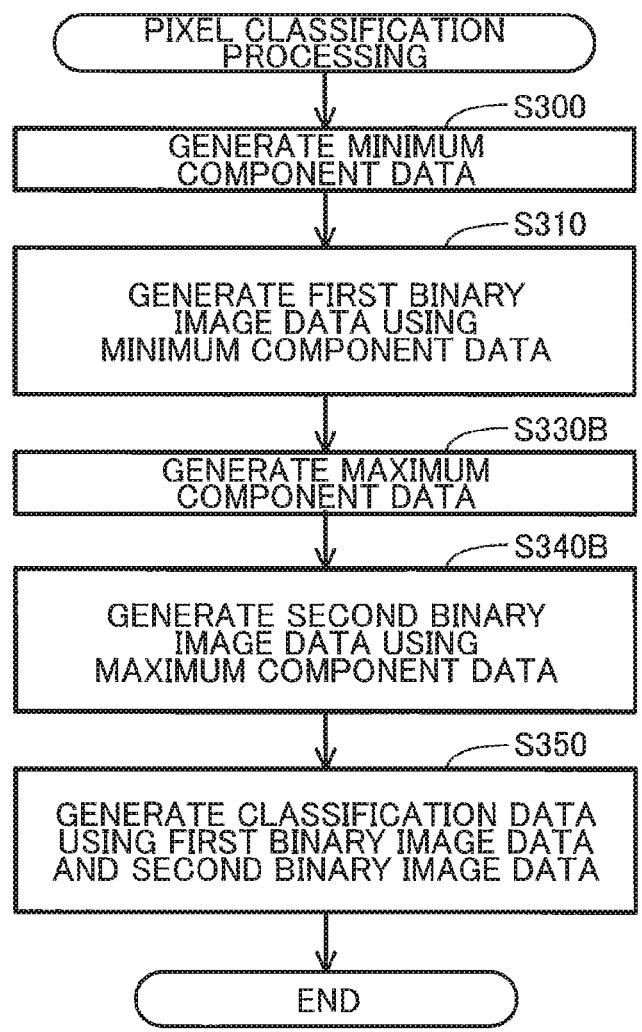
FIG. 11 is a flowchart illustrating steps in pixel classification processing executed by the multifunction peripheral according to the third embodiment.

According to the second embodiment described above, the CPU 210 generates the minimum component data using the scan data (S300 of FIG. 11). The CPU 210 then specifies the plurality of first edge pixels constituting the edges in the minimum component image MNI represented by the minimum component data using the minimum component data (S310). The CPU 210 generates the inverted minimum component data using the scan data (S320 and S330). The CPU 210 specifies the plurality of second edge pixels constituting the edges in the inverted minimum component image MRI represented by the inverted minimum component data using the inverted minimum component data (S340). The CPU 210 then specifies the plurality of edge pixels constituting the edges in the scan image SI on the basis of the plurality of first edge pixels specified using the minimum component data and the plurality of second edge pixels specified using the inverted minimum component data (S350). As a result, omission in specifying the edge pixels in the scan image SI is reduced to thereby improve the accuracy of specifying the edge pixels in the scan image SI.

In the minimum component image MNI represented by the minimum component data, there may be a case where no edge appears between the background and an object such as a character, depending on, for example, a combination of the color of the background and the color of the object. For example, in the minimum component data, since differences among the pixel values in a portion representing any of C, M, Y, and K dots are small, there is a possibility that no edge appears between the background and the character in the minimum component image MNI when the background has a color (black or gray) constituted by K dots and the character has a color constituted by any of C, M, and Y dots. In the inverted minimum component data, however, a large difference exists between the pixel values in a portion representing any of C, M, and Y dots and the pixel value in a portion representing K dots. Thus, the edge appears between the background and the character in the inverted minimum component image MRI. Conversely, there may be a case where an edge that does not appear in the inverted minimum component image MRI appears in the minimum component image MNI, depending on a combination of the color of the background and the color of the object such as a character. In the second embodiment, as described above, the edge pixel that cannot be specified using only one of the minimum component data and the inverted minimum component data can be specified. Accordingly, omission in specifying the edge pixels in the scan image SI can be reduced.

Further, as illustrated in FIGS. 10A to 10E, also in the inverted minimum component data, out of five types of elements constituting the halftone dots area, namely, the C, M, Y, and K dots and the base color (white) of the paper sheet, differences among the pixel values representing four types of elements of the C, M, and Y dots and the base color (white) of the paper sheet can be reduced. Thus, even when the inverted minimum component data is used, it can be prevented that edge pixels are erroneously specified in a uniform portion or a portion different from the edge. Accordingly, the accuracy of specifying the edge pixels in the scan image SI can be improved.

In the second embodiment, as described above, the CPU 210 takes the logical sum of the pixel values in the first and second binary image data to thereby generate the binary image data as the classification data (S350). In other words, the CPU 210 finally specifies, as the plurality of edge pixels, a pixel group including the plurality of first edge pixels specified using the minimum component data and the plurality of second edge pixels specified using the inverted minimum component data and not including pixels different from both the first and second edge pixels. As a result, omission in specifying the edge pixels in the scan image SI can be effectively reduced.

C. Third Embodiment

In a third embodiment, pixel classification processing different from those in the first and second embodiments is executed. Other image processing procedures executed in the third embodiment are the same as those in the first and second embodiments. FIG. 11 is a flowchart illustrating steps in the pixel classification processing of the third embodiment.

In the pixel classification processing of the third embodiment, S330B of FIG. 11 is executed in place of S320 and S330 of FIG. 9, and S340B of FIG. 11 is executed in place of S340 of FIG. 9. Other procedures in the pixel classification processing of the third embodiment are the same as those in the pixel classification processing of FIG. 9.

In S330B, the CPU 210 generates maximum component data using the scan data. Specifically, the CPU 210 acquires a maximum component value Vmax from each of the plurality of pixel values (RGB values) included in the scan data. The maximum component value Vmax is the maximum value among the plurality of component values (R value, G value, and B value) included in the corresponding RGB value. The CPU 210 generates, as the maximum component data, image data which includes, as a plurality of pixel values, a plurality of maximum component values Vmax corresponding to respective ones of the plurality of pixels. The maximum component data is image data representing an image having the same size as that of the scan image SI. Each of the plurality of pixel values included in the maximum component data is the maximum component value Vmax of the corresponding pixel value (RGB value) in the scan data.

FIGS. 5A to 5E illustrate the maximum component values Vmax of respective C, M, Y, K, and W by bar graphs. As illustrated in FIGS. 5A to 5E, the maximum component values Vmax of the respective C, M, Y, K, and W are 255, 255, 255, 0, and 255. That is, the maximum component values Vmax are the same value except for that of black (K). Thus, also in the maximum component data, as in the inverted minimum component data of the second embodiment, out of five types of elements constituting the halftone dots area, namely, the C, M, Y, and K dots and the base color (white) of the paper sheet, differences among the pixel values representing four types of elements (the C, M, and Y dots and the base color (white) of the paper sheet) can be reduced. FIG. 6C illustrates an example of a maximum component image MAI represented by the maximum component data. In the maximum component image MAI, the pixel value in an area MDc corresponding to the M dot MD in the scan image SI and the pixel value in an area YDc corresponding to the Y dot YD in the scan image SI are the same as each other, as in the inverted minimum component image MRI.

In S340B, the CPU 210 applies the processing of S210 to S250 of FIG. 4 to the maximum component data. That is, in the third embodiment, the maximum component data is used for generating the second binary image data representing the second edge pixels in place of the inverted minimum component data.

According to the third embodiment described above, the same functions and effects as those of the second embodiment can be achieved.

Note that the inverted minimum component values VRmin, those are respective ones of the plurality of pixel values in the inverted minimum component data of the second embodiment, are respective values obtained by respectively inverting the maximum component values Vmax, those are respective ones of the plurality of pixel values in the maximum component data of the third embodiment. Accordingly, it can be said that the inverted minimum component value VRmin is a value obtained on the basis of the maximum component value Vmax, that is, a value related to the maximum component value Vmax. In other words, both the inverted minimum component data of the second embodiment and the maximum component data of the third embodiment are image data which includes a value obtained on the basis of the maximum value among the plurality of component values included in each of the plurality of pixel values constituting the scan data (the inverted value of the maximum value or the maximum value itself) as corresponding one of the plurality of pixel values.

D. Modifications (1) In the pixel classification processing of the first embodiment (FIG. 4), the minimum component data is generated in S200. Alternatively, in S200, the inverted minimum component data of the second embodiment or the maximum component data of the third embodiment may be generated. Generally, in S200, the CPU 210 may generate one of first component image data and second component image data in S200. Each of a plurality of values included in the first component image data is a value based on the maximum value among the plurality of component values included in the corresponding pixel value of the scan data. Each of a plurality of values included in the second component image data is a value based on the minimum value among the plurality of component values included in the corresponding pixel value of the scan data.

(2) In the pixel classification processing of the embodiments described above, the pixel classification processing of the first embodiment (FIG. 4) may be changed appropriately. For example, a part or all of the smoothing processing of S210, the level modification processing of S230, and the isolated pixel removal processing of S250 may be omitted. Also when the processes of S210 to S250 of FIG. 4 are performed in S310 and S340 of the second embodiment (FIG. 9) and in S310 and S340B of the third embodiment (FIG. 11), a part or all of the smoothing processing of S210, the level modification processing of S230, and the isolated pixel removal processing of S250 may be omitted.

(3) In the embodiments described above, each of the plurality of pixel values constituting the scan data is represented by the RGB value, but may be represented by a color value of another color system. For example, each of the plurality of pixel values constituting the scan data may be represented by a color value of a CMY color system including three component values of C, M, and Y.

(4) In the embodiments described above, the edge sharpening processing is applied to the edge pixel values (S40 of FIG. 2), and the halftone dots smoothing processing is applied to the non-edge pixel values (S30 of FIG. 2). Alternatively, anti-alias processing for improving appearance of characters may be applied to the edge pixel values. Further, the processing of washing out color (processing of converting the color of the pixel into white) may be applied to the non-edge pixel values for the purpose of reducing the amount of color materials for use in printing. In general, mutually different image processing is preferably applied to the edge pixel values and non-edge pixel values. Alternatively, specific image processing may be applied to only one of the edge pixel values and non-edge pixel values.

(5) In the embodiments described above, the Gaussian filter GF having a filter range of three-by-three pixels arranged in a matrix form is used in the smoothing processing executed in S210 of FIG. 4. Alternatively, a Gaussian filter GF or a mean value filter having a filter range of five-by-five pixels arranged in a matrix form or seven-by-seven pixels arranged in a matrix form may be used. Thus, the number of peripheral pixels used in the smoothing processing can be appropriately changed depending on reading characteristics such as the resolution or blurring degree of the scan data.

(6) In the embodiments described above, the Sobel filter is used in the edge extraction processing executed in S220 of FIG. 4. Alternatively, another edge extraction filter such as a Roberts filter or a Laplacian filter may be used in the edge extraction processing.

(7) In the embodiments described above, the scan data is used as the target image data, but the target image data is not limited to the scan data. Alternatively, photographed image data generated by photographing an original using a digital camera may be used as the target image data. Further, image data generated by using an application program for creating documents or illustrations may be used as the target image data.

(8) In the embodiments described above, print data is generated using the processed image data in S50 of FIG. 2. Alternatively, image data for storage (for example, a PDF file) may be generated using the processed image data.

(9) In the second and third embodiments described above, the final classification data is generated by taking the logical sum of the first binary image data and second binary image data (S350 of FIG. 9 and the like). Alternatively, for example, the final classification data may be generated by taking the logical sum of the first binary image data and second binary image data to obtain the binary image data and applying the isolated pixel removal processing to the obtained binary image data to generate the binary image data that has been subjected to the isolated pixel removal processing. In this case, the isolated pixel removal processing need not be executed in the generation processing of the first binary image data and second binary image data.

(10) In the second and third embodiments described above, the final classification data is generated by taking the logical sum of the first binary image data and the second binary image data (S350 of FIG. 9 and the like). Alternatively, the final classification data may be generated by taking the logical sum of the first binary image data, the second binary image data, and third binary image data. In this case, the third binary image data may be binary image data obtained by binarizing luminance image data representing the luminance of each of the pixels constituting the scan image represented by the scan data. Thus, omission in specifying the edge of, for example, a character can be further reduced.

(11) The image processing apparatus realizing the image processing of FIG. 2 is not limited to the multifunction peripheral 200, but may be any one of various devices. For example, a scanner or a digital camera may execute the image processing of FIG. 2 by using target image data generated by itself so as to generate print data to be supplied to a printer. Further, for example, a terminal device (for example, the user terminal device 100) or a server (not illustrated) that can communicate with a scanner and a printer may execute the image processing of FIG. 2 by using scan data acquired from the scanner to generate print data to be supplied to the printer. Further, a plurality of computers (for example, cloud servers) communicable with one another through a network may execute the image processing as a whole while sharing the function required for the image processing among them. In this case, the whole of the plurality of computers is an example of the image processing apparatus.

(12) In the embodiments described above, some of the configurations implemented through hardware may be replaced by software, and conversely, some or all of the configurations implemented through software may be replaced by hardware. For example, the inverted image data generation processing executed in S320 of FIG. 9, the minimum component data generation processing executed in S310 of FIGS. 9 and 11, and the inverted minimum component data generation processing executed in S330 of FIG. 9 may be executed by dedicated hardware such as an ASIC.

While the description has been made in detail with reference to specific embodiments, each of the embodiments described above is an example for making the present disclosure easier to understand but does not limit the present disclosure. It would be apparent to those skilled in the art that various changes and modifications may be made thereto.

What is claimed is:

1. An image processing apparatus comprising:
a processor; and
a memory storing a set of computer-readable instructions therein, the set of computer-readable instructions, when executed by the processor, causing the image processing apparatus to perform:
acquiring target image data representing a target image including a plurality of pixels, the target image data including a plurality of pixel values corresponding to respective ones of the plurality of pixels, each of the plurality of pixel values having a plurality of component values;
generating first image data representing a first image, the first image data being one of first component data and second component data, the first component data including a plurality of first pixel values corresponding to respective ones of the plurality of pixels, each of the plurality of first pixel values being related to a maximum value among the plurality of component values of corresponding one of the plurality of pixels, the second component data including a plurality of second pixel values corresponding to respective ones of the plurality of pixels, each of the plurality of second pixel values being related to a minimum value among the plurality of component values of corresponding one of the plurality of pixels;
calculating a plurality of first edge strengths corresponding to respective ones of the plurality of pixels using the first image data to generate first edge strength data including the plurality of first edge strengths; and
specifying a plurality of edge pixels included in the target image, wherein the specifying includes binarizing the first edge strength data to generate first binary image data.

2. The image processing apparatus according to claim 1, wherein the set of computer-readable instructions, when executed by the processor, causes the image processing apparatus to further perform:
smoothing the first image to generate smoothed image data representing a smoothed first image, and
wherein the calculating calculates the plurality of first edge strengths using the smoothed image data to generate the first edge strength data.

3. The image processing apparatus according to claim 1, wherein the plurality of first edge strengths falls within a predetermined range ranging from a minimum value to a maximum value, the predetermined range being divided into a first range and a second range, the first range including one of the minimum value and the maximum value, the plurality of first edge strengths including a first value in the first range and a second value in the second range,
wherein the set of computer-readable instructions, when executed by the processor, causes the image processing apparatus to further perform:
modifying the first edge strength data to generate modified edge strength data including a plurality of modified edge strengths falling within the predetermined range, the first value being modified into the one of the minimum value and the maximum value, the second value being modified into a value falling within and distributable over the predetermined range, and
wherein the binarizing binarizes the modified edge strength data to generate the first binary image data.

4. The image processing apparatus according to claim 1, wherein the specifying further includes:
specifying a plurality of candidate pixels using the first binary image data; and
removing an isolated candidate pixel from the plurality of candidate pixels to generate removed binary image data, the plurality of edge pixels being specified using the removed binary image data.

5. The image processing apparatus according to claim 1, wherein the set of computer-readable instructions, when executed by the processor, causes the image processing apparatus to further perform:
generating second image data representing a second image, the second image data being another one of the first component data and the second component data; and
calculating a plurality of second edge strengths corresponding to respective ones of the plurality of pixels using the second image data to generate second edge strength data including the plurality of second edge strengths, and
wherein the specifying further includes:
binarizing the second edge strength data to generate second binary image data;
specifying a plurality of first candidate pixels using the first binary image data; and
specifying a plurality of second candidate pixels using the second binary image data, the plurality of edge pixels being specified using the plurality of first candidate pixels and the plurality of second candidate pixels.

6. The image processing apparatus according to claim 1, wherein each of the plurality of pixel values is a color value of an RGB color system.

7. The image processing apparatus according to claim 1, wherein the target image includes the plurality of edge pixels and a plurality of non-edge pixels, the plurality of edge pixels having respective ones of a plurality edge pixel values, the plurality of non-edge pixels having respective ones of a plurality of non-edge pixel values, and
wherein the set of computer-readable instructions, when executed by the processor, causes the image processing apparatus to further perform:
applying first image processing to the plurality of edge pixel values and applying second image processing different from the first image processing to the plurality of non-edge pixel values to generate processed target image data.

8. The image processing apparatus according to claim 7, wherein the set of computer-readable instructions, when executed by the processor, causes the image processing apparatus to further perform:
generating print data using the processed target image data.

9. The image processing apparatus according to claim 1, wherein the acquiring acquires the target image data generated by scanning an original with an image sensor.

10. A non-transitory computer readable storage medium storing a set of program instructions installed on and executed by a computer, the set of program instructions comprising:
    acquiring target image data representing a target image, the target image including a plurality of pixels, each of the plurality of pixels having a plurality of component values;
    generating first image data representing a first image, the first image data being one of first component data and second component data, the first component data including a plurality of first pixel values corresponding to respective ones of the plurality of pixels, each of the plurality of first pixel values being related to a maximum value among the plurality of component values of corresponding one of the plurality of pixels, the second component data including a plurality of second pixel values corresponding to respective ones of the plurality of pixels, each of the plurality of second pixel values being related to a minimum value among the plurality of component values of corresponding one of the plurality of pixels;
    calculating a plurality of first edge strengths corresponding to respective ones of the plurality of pixels using the first image data to generate first edge strength data including the plurality of first edge strengths; and
    specifying a plurality of edge pixels included in the target image, wherein the specifying includes binarizing the first edge strength data to generate first binary image data.

11. The non-transitory computer readable storage medium according to claim 10, wherein the set of program instructions further comprises:
    smoothing the first image to generate smoothed image data representing a smoothed first image, and
    wherein the calculating calculates the plurality of first edge strengths using the smoothed image data to generate the first edge strength data.

12. The non-transitory computer readable storage medium according to claim 10, wherein the plurality of first edge strengths falls within a predetermined range ranging from a minimum value to a maximum value, the predetermined range being divided into a first range and a second range, the first range including one of the minimum value and the maximum value, the plurality of first edge strengths including a first value in the first range and a second value in the second range,
    wherein the set of program instructions further comprises:
        modifying the first edge strength data to generate modified edge strength data including a plurality of modified edge strengths falling within the predetermined range, the first value being modified into the one of the minimum value and the maximum value, the second value being modified into a value falling within and distributable over the predetermined range, and
    wherein the binarizing binarizes the modified edge strength data to generate the first binary image data.

13. The non-transitory computer readable storage medium according to claim 10, wherein the specifying further includes:
    specifying a plurality of candidate pixels using the first binary image data; and
    removing an isolated candidate pixel from the plurality of candidate pixels to generate removed binary image data, the plurality of edge pixels being specified using the removed binary image data.

14. The non-transitory computer readable storage medium according to claim 10, wherein the set of program instructions further comprises:
    generating second image data representing a second image, the second image data being another one of the first component data and the second component data; and
    calculating a plurality of second edge strengths corresponding to respective ones of the plurality of pixels using the second image data to generate second edge strength data including the plurality of second edge strengths, and
    wherein the specifying further includes:
        binarizing the second edge strength data to generate second binary image data;
        specifying a plurality of first candidate pixels using the first binary image data; and
        specifying a plurality of second candidate pixels using the second binary image data, the plurality of edge pixels being specified using the plurality of first candidate pixels and the plurality of second candidate pixels.

15. The non-transitory computer readable storage medium according to claim 10, wherein the plurality of component values is a color value of an RGB color system.

16. The non-transitory computer readable storage medium according to claim 10, wherein the target image includes the plurality of edge pixels and a plurality of non-edge pixels, the plurality of edge pixels having respective ones of a plurality edge pixel values, the plurality of non-edge pixels having respective ones of a plurality of non-edge pixel values, and
    wherein the set of computer-readable instructions further comprises:
        applying first image processing to the plurality of edge pixel values and applying second image processing different from the first image processing to the plurality of non-edge pixel values to generate processed target image data.

17. The non-transitory computer readable storage medium according to claim 16, wherein the set of computer-readable instructions further comprises:
    generating print data using the processed target image data.

18. The non-transitory computer readable storage medium according to claim 10, wherein the acquiring acquires the target image data generated by scanning an original with an image sensor.

19. An image processing method comprising:
    acquiring target image data representing a target image, the target image including a plurality of pixels, each of the plurality of pixels having a plurality of component values;
    generating image data, the image data being one of first component data and second component data, the first component data including a plurality of first pixel values corresponding to respective ones of the plurality of pixels, each of the plurality of first pixel values being related to a maximum value among the plurality of component values of corresponding one of the plurality of pixels, the second component data including a plurality of second pixel values corresponding to respective ones of the plurality of pixels, each of the plurality of second pixel values being related to a minimum value among the plurality of component values of corresponding one of the plurality of pixels;

calculating a plurality of edge strengths corresponding to respective ones of the plurality of pixels using the image data to generate edge strength data including the plurality of edge strengths; and specifying a plurality of edge pixels included in the target image, wherein the specifying includes binarizing the edge strength data to generate binary image data.

* * * * *